United States Patent
Ishida

[11] Patent Number: 5,408,336
[45] Date of Patent: Apr. 18, 1995

[54] IMAGE PROCESSING APPARATUS WITH VARIABLE SMOOTHING PROCESSING

[75] Inventor: Shinichi Ishida, Tokyo, Japan

[73] Assignee: Canon Kabushiki Kaisha, Tokyo, Japan

[21] Appl. No.: 823,474

[22] Filed: Jan. 22, 1992

[30] Foreign Application Priority Data

Jan. 23, 1991 [JP] Japan ................... 3-006394

[51] Int. Cl.⁶ .............................................. H04N 1/40
[52] U.S. Cl. ..................... 358/447; 358/445; 358/446; 358/447; 358/465; 358/466
[58] Field of Search ............ 358/429, 453, 447, 455, 358/456, 457, 458, 459, 465, 462, 466, 471, 474, 296, 298; 382/49, 50; H04N 1/40

[56] References Cited

U.S. PATENT DOCUMENTS

| | | | |
|---|---|---|---|
| 4,698,691 | 10/1987 | Suzuki et al. | 358/458 |
| 4,868,684 | 9/1989 | Suzuki | 358/455 |
| 4,878,126 | 10/1989 | Ichikawa | 356/451 |
| 4,890,121 | 12/1989 | Hirahara et al. | 346/76 PH |
| 4,924,509 | 5/1990 | Yokomizo | 382/50 |
| 5,177,623 | 1/1993 | Hirota | 358/456 |
| 5,291,309 | 3/1994 | Semasa | 358/458 |

FOREIGN PATENT DOCUMENTS

| | | | |
|---|---|---|---|
| 194689 | 9/1986 | European Pat. Off. | G06F 15/68 |
| 227848 | 7/1987 | European Pat. Off. | H04N 1/40 |
| 0392781A2 | 4/1990 | European Pat. Off. | H04N 1/40 |

Primary Examiner—Stephen Brinich
Assistant Examiner—Jerome Grant, II
Attorney, Agent, or Firm—Fitzpatrick, Cella, Harper & Scinto

[57] ABSTRACT

There is disclosed an image processing apparatus capable of smoothing the image in obtaining a binary image, by eliminating notches through comparison of the input image data with certain notch image patterns stored in the apparatus in advance. In order to maintain an effect of smoothing even when the resolution of the input image data is increased, the image patterns employed for the above-mentioned comparison are varied according to the resolution of the input image data.

24 Claims, 9 Drawing Sheets

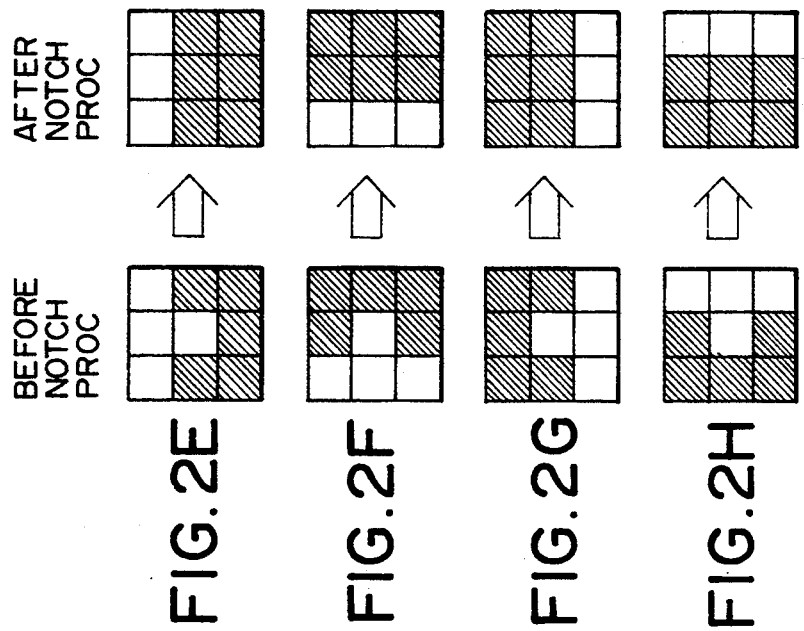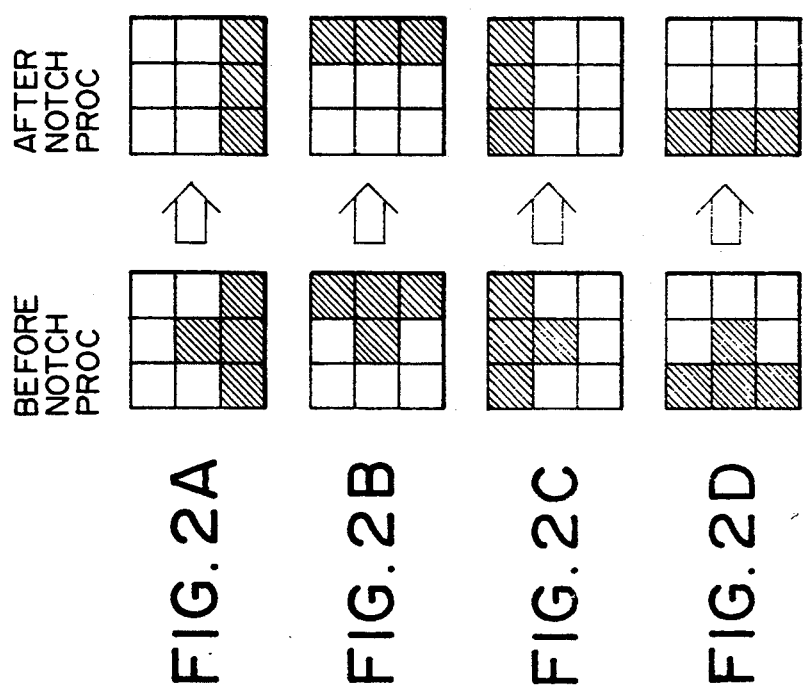

| BEFORE NOTCH PROC | | AFTER NOTCH PROC |
|---|---|---|
| 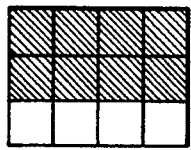 | ⇑ | 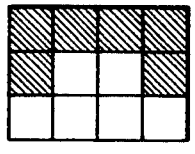 |
FIG.3A
| 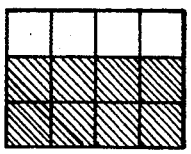 | ⇑ | 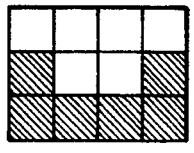 |
|---|---|---|
FIG.3B
| 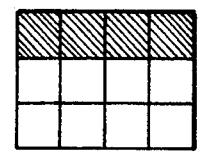 | ⇑ | 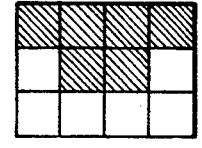 |
|---|---|---|
FIG.3C
| 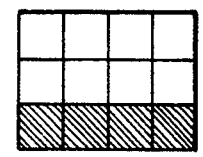 | ⇑ | 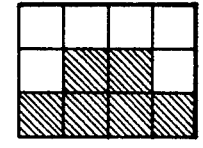 |
|---|---|---|
FIG.3D
| BEFORE NOTCH PROC | | AFTER NOTCH PROC |
|---|---|---|
| 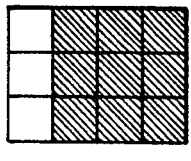 | ⇑ | 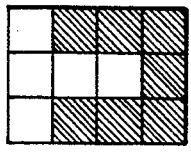 |
FIG.3E
| 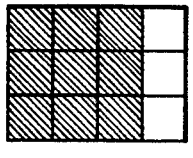 | ⇑ | 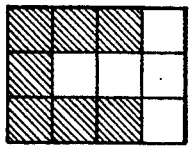 |
|---|---|---|
FIG.3F
| 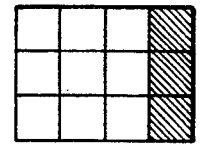 | ⇑ | 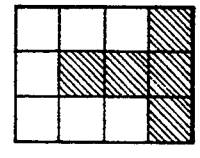 |
|---|---|---|
FIG.3G
| 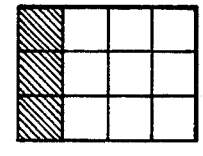 | ⇑ |  |
|---|---|---|
FIG.3H

FIG. 5

| INPUT | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| OUTPUT | 63 | 52 | 46 | 42 | 38 | 35 | 33 | 31 | 29 | 28 | 26 | 25 | 24 | 23 | 21 | 21 | 20 | 19 | 18 | 17 |
| | 20 | 21 | 22 | 23 | 24 | 25 | 26 | 27 | 28 | 29 | 30 | 31 | 32 | 33 | 34 | 35 | 36 | 37 | 38 | 39 |
| | 16 | 16 | 15 | 14 | 14 | 13 | 13 | 12 | 11 | 11 | 10 | 10 | 10 | 9 | 9 | 8 | 8 | 7 | 7 | 7 |
| | 40 | 41 | 42 | 43 | 44 | 45 | 46 | 47 | 48 | 49 | 50 | 51 | 52 | 53 | 54 | 55 | 56 | 57 | 58 | 59 |
| | 6 | 6 | 6 | 5 | 5 | 5 | 4 | 4 | 4 | 3 | 3 | 3 | 0 | 0 | 0 | 0 | 0 | 0 | 0 | 0 |
| | 60 | 61 | 62 | 63 | | | | | | | | | | | | | | | | |
| | 0 | 0 | 0 | 0 | | | | | | | | | | | | | | | | |

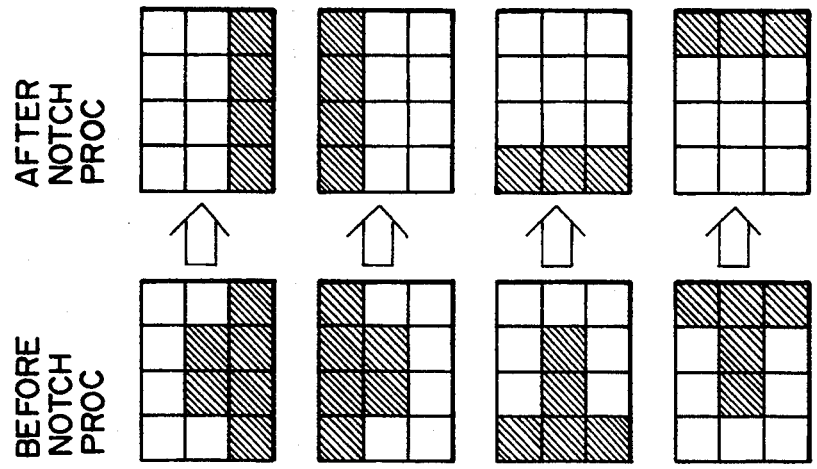
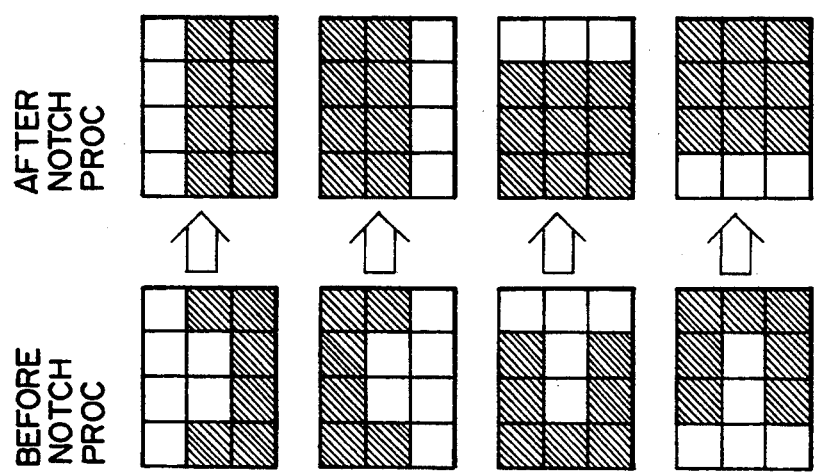

IMAGE PROCESSING APPARATUS WITH VARIABLE SMOOTHING PROCESSING

BACKGROUND OF THE INVENTION

Field of the Invention

The present invention relates to an image processing apparatus capable of effecting a smoothing process on input image data, and more particularly such image processing apparatus capable of obtaining a high-quality image by varying the smoothing process according to the resolution of the input image data.

Related Background Art

For improving the image quality for example of black-and-white binary image data, there is already known so-called smoothing processing for eliminating notches.

A notch in the image means, as shown in FIG. 9, a protruding portion generated in a non-character area or a recessed white portion generated in a character area, and is a cause of deterioration of image quality. Also in an apparatus for binary image transmission with image data compression, such as a facsimile apparatus, notch generation deteriorates efficiency of data compression, thereby prolonging the image transmission time. Notch elimination, to smooth the image by removing such protruding or recessed notches.

A conventional notch eliminating process consists of preparing 8 notch patterns in 3×3 pixel matrix as shown in FIG. 2A–2H, detecting a notch by comparing a binary image, obtained by reading an original image, with said notch patterns, and effecting a smoothing process when a notch is indicated by the coincidence of the binary image with one of the notch patterns. The smoothing or notch elimination is conducted by replacing the pixels constituting the notch, if they are black or white ones, respectively with white or black pixels. However, such conventional process is associated with the following drawback.

In the facsimile, the resolution of image reading in the sub-scanning direction is generally switchable among 15.4, 7.7 and 3.85 l/mm, and the recording dot size is made larger as the image reading resolution becomes lower.

Thus, in the notch elimination with 3×3 matrixes, the improvement in image quality is evident when the image is read with a low resolving power (3.85 l/mm) as the eliminated dots are large, but said improvement is not evident when the image reading resolution is high (15.4 l/mm) as the eliminated dots become smaller.

SUMMARY OF THE INVENTION

The present invention is to resolve the drawbacks in the above-explained prior art, and an object thereof is to provide an image processing apparatus capable of providing a high-quality image, from an input image of high or low resolving power.

Another object of the present invention is to provide an image processing apparatus capable of providing a high-quality image by notch elimination, from an input image of high or low resolving power, and also capable of improving the encoding efficiency of the image by notch elimination.

The above-mentioned objects can be attained, according to the present invention, by an image processing apparatus comprising input means for entering image data; memory means for storing plural image patterns; comparator means for comparing the image data entered by said input means with the image patterns stored in said memory means; and smoothing means for smoothing said input image data according to the result of comparison by said comparator means, wherein said comparator means is adapted to vary the image patterns to be used in said comparison, according to the resolving power of the image data entered by said input means.

Still another object of the present invention is to provide an image processing apparatus capable of providing a smooth character image without notches, and a halftone image of high quality with suppressed granular noises.

Still other objects of the present invention, and the advantages thereof, will become fully apparent from the following description, which is to be taken in conjunction with the attached drawings.

BRIEF DESCRIPTION OF THE DRAWINGS

FIGS. 2A to 2H are views of notch patterns to be used in the image reading with a standard resolution or a high resolution;

FIGS. 3A to 3H are views of notch patterns to be used in the image reading with a high resolution;

FIG. 5 is a view of a luminance-density conversion table;

FIGS. 8A to 8H are views of notch patterns to be used in the image reading with a high resolution in the main scanning direction.

DETAILED DESCRIPTION OF THE PREFERRED EMBODIMENT

Figure 1:
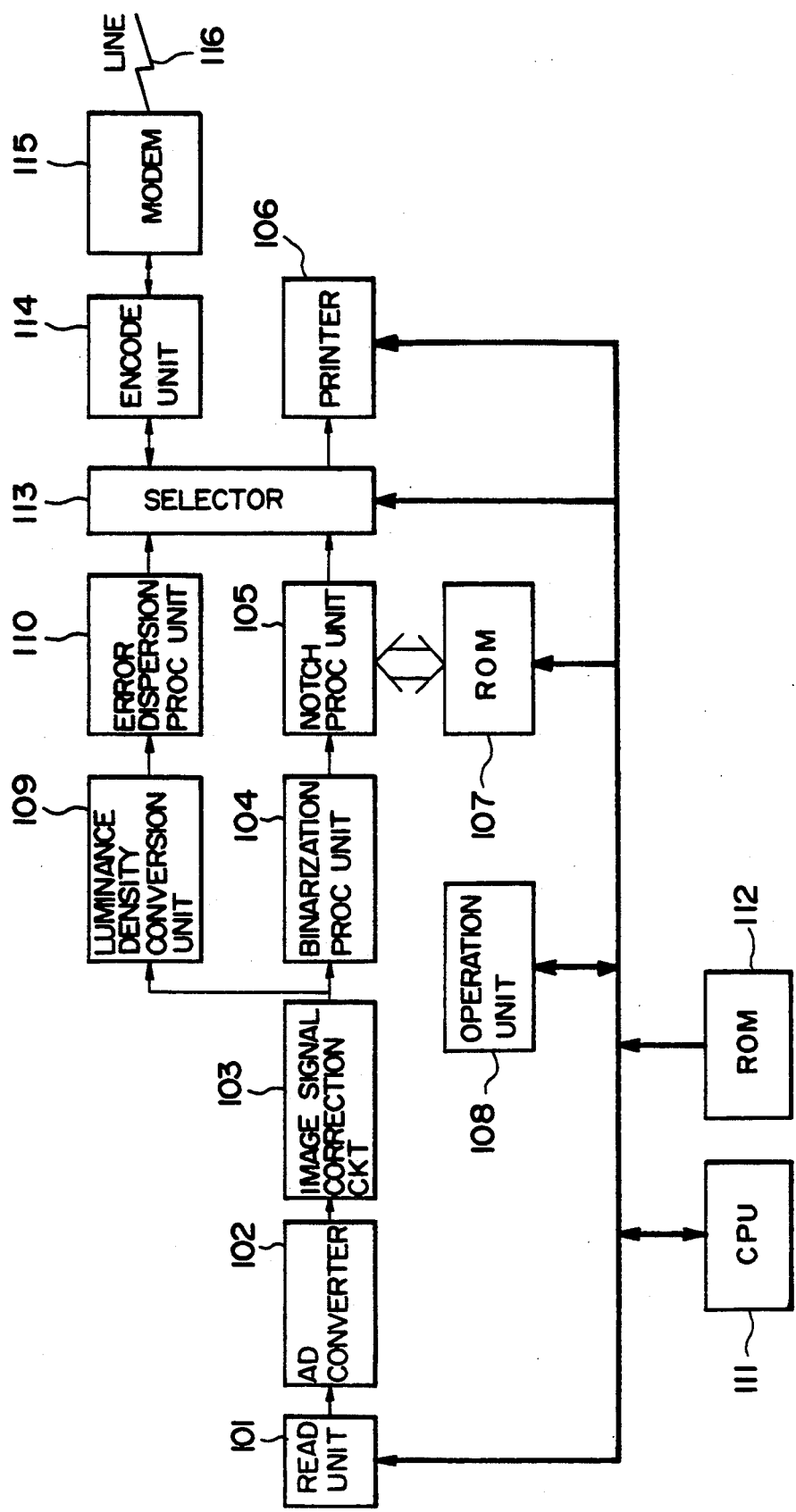
FIG. 1 is a block diagram of a facsimile apparatus constituting an embodiment of the present invention.

FIG. 1 is a block diagram of a facsimile apparatus and best represents the features of the present invention. A reader unit 101 reads the original information with a CCD line sensor (solid-state image pickup device) and converts said information into electrical signals.

An operation unit 108, for operating the facsimile apparatus, is provided with plural input key switches, a key scanning circuit, a display unit such as liquid crystal display unit for displaying various information, and a display drive circuit. In the reader unit 101, the image reading resolution in the sub scanning direction is selected either at a high resolution mode (8×7.7 l/mm) or a standard resolution mode (8×3.85 l/mm) by a key operation in the operation unit 108.

An A/D converter 102 converts analog image data, obtained by original image reading in the reader unit 101, into 6-bit digital image data.

Said digital image data represent luminance of 64 levels, in which the lowest luminance level (000000) represents darkest black and the highest luminance level (111111) represents lightest white.

The luminance data from the A/D converter 102 are sent to an image signal correction circuit 103 for correcting the unevenness in sensitivity of the CCD in the reader unit 101 and the shading resulting from distortion in light distribution of the light source.

A binarization process unit 104 effects binary digitization on the output signal from the image signal correction circuit 103 to obtain binary data of white or black, utilizing a fixed threshold value. Said binary digitization can be represented by:

$$X_{ij} \geq TH \quad Y_{ij}=0 \text{ (white)}$$

$$X_{ij} < TH \quad Y_{ij}=63 \text{ (black)}$$

wherein TH is the threshold value (=38), $X_{ij}$ is the output signal of the image signal correction circuit 103 (i : main scanning, j : sub scanning), and $Y_{ij}$ is the output signal after binary digitization.

A notch processing unit 105 detects and eliminates the notch components in the binary output signal from the binarization process unit 104, and a ROM (read-only memory) 107 stores notch patterns in advance. Said notch processing unit 105 compares plural binary signals from the binarization process unit 104 with the notch patterns stored in the ROM 107, and, if said binary signals coincide with any one of said plural notch patterns, effects elimination of thus detected notch.

Said ROM 107 stores 8 patterns shown in FIGS. 2A to 2H and 8 patterns shown in FIGS. 3A to 3H, or 16 patterns in total. The patterns shown in FIGS. 3A to 3H are used in the image reading with the high resolution. Thus, when the image reading with the standard resolution is instructed from the operation unit 108 to the reader unit 101, the notch process unit 105 only uses the 8 patterns shown in FIGS. 2A to 2H. When the image reading with the high resolution is instructed, the notch process unit 105 uses the 16 patterns shown in FIGS. 2A to 2H and 3A to 3H.

The output dot size of an image read with the high resolution is smaller than that read with the standard resolution. Thus, if a pattern shown in FIG. 3A is present in the input image data, two white pixels in the center are replaced by black pixels. In this manner the effect of notch elimination can be improved in comparison with the case shown in FIG. 2C, in which a white pixel at the center is replaced by a black pixel.

Figure 4:
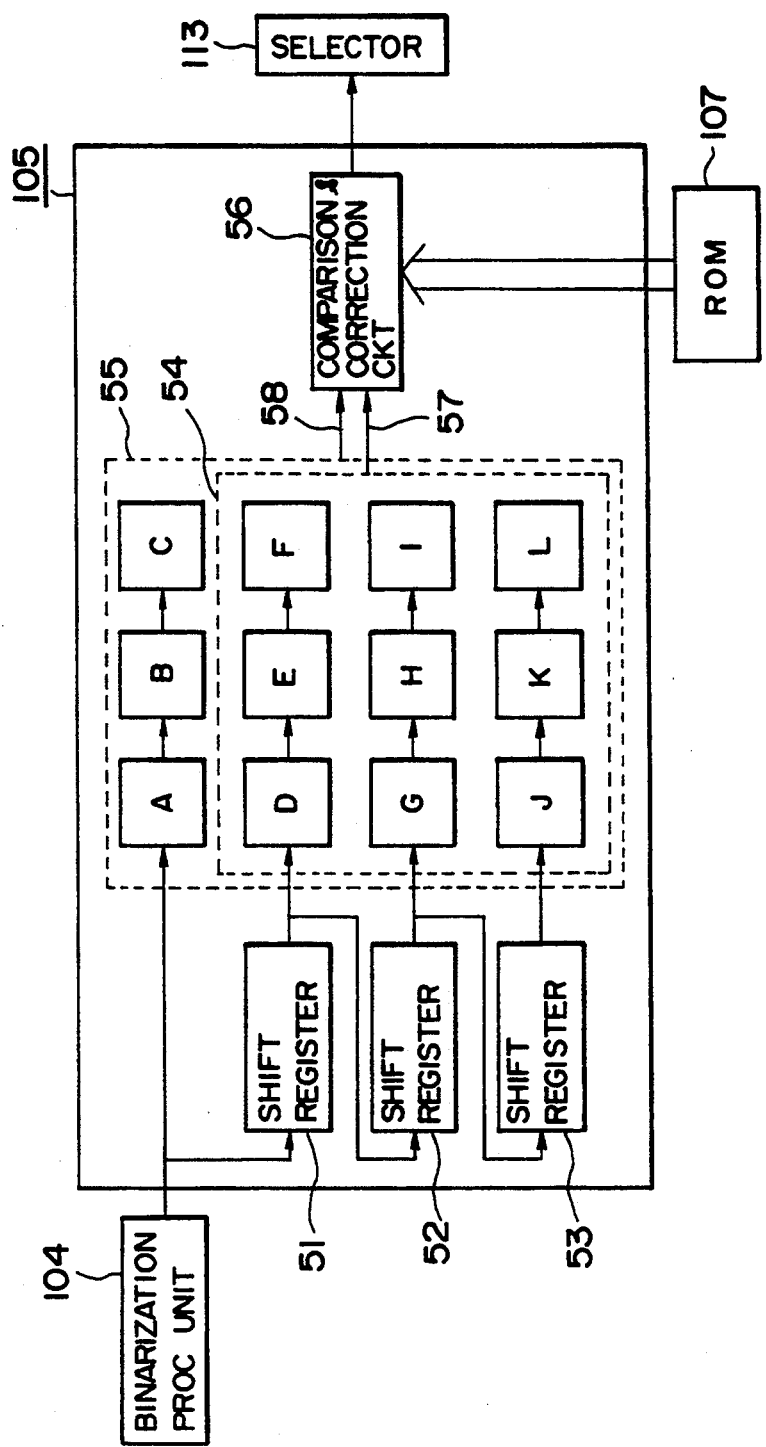
FIG. 4 is a detailed block diagram of a notch processing unit 105.

FIG. 4 is a detailed block diagram of the notch processing unit 105, wherein are provided shift registers 51, 52, 53 each capable of storing information of aline or three pixels, and registers A–L. A binary signal from the binarization process unit 104 is supplied to the register A and also to the shift register 51 capable of storing information of a line, or three pixels. At each entry of a pixel signal, the data are shifted and are stored in a window 54 consisting of 3×3 pixels and a window 55 consisting of 3×4 pixels.

A comparison/correction circuit 56 receives binary data from the windows 54, 55 through signal lines 57, 58, effects comparison with plural notch patterns supplied from the ROM 107 and eliminates a notch in case a coincidence is found in the comparison.

When an image reading mode with the standard resolution is selected, the comparison/correction circuit 56 compares the binary data of 3×3 pixels in the window 54, supplied through the signal line 57, with plural (eight) notch patterns, shown in FIGS. 2A-2H, sent from the ROM 107, and effects notch elimination in case said binary data coincide with any of said notch patterns. Also when an image reading mode with the high resolution is selected, said circuit 56 compares the binary data of 3×3 in the window 54 and 3×4 pixels in the window 55, supplied through the signal lines 57, 58, with 16 notch patterns, shown in FIGS. 2A-2H and 3A-3H, sent from the ROM 107, and effects notch elimination in case said binary data coincide with any of said notch patterns.

The image processed in the binarization process unit 104 and the notch process unit 105 is selected, when the character mode is selected in the operation unit 108.

Again referring to FIG. 1, a luminance-density conversion unit 109 is composed of a ROM for converting 6-bit input luminance data from the image signal correction circuit 103 into 6-bit density data.

In general luminance and density are correlated by:

$$[\text{density}] = -\gamma \cdot \log[\text{luminance}]$$

wherein $\gamma$ is a positive constant, and the conversion table 109 stores data based on this equation. FIG. 5 shows an example of the conversion table.

An error dispersion process unit 110 digitizes the 6-bit density data form the luminance-density conversion table 109 into 1-bit binary signals. In the table shown in FIG. 5, high-luminance data, equal to level 52 or higher, are released as zero density, thereby suppressing the granular noises in the highlight area, often observed in a halftone image processed by the error dispersion method. It is also rendered possible, in this manner, to improve the encoding efficiency after binary digitization in the error dispersion method.

A CPU 111 controls the entire facsimile apparatus, according to a program stored in a ROM 112.

The above-mentioned error dispersion method is reported by R. W. Floyd and L. Steinberg in "An Adaptive Algorithm for Spatial Gray Scale" SID 75 Digest (1976).

Said error dispersion method can be mathematically represented as follows:

$$D_{i,j} = X_{i,j} + (\Sigma\Sigma \alpha_{i+m,j+n} E_{i+m,j+n})(1/\Sigma \alpha_{m,n})$$

$$Y_{i,j}=63 \quad )D_{i,j} \geq T)$$

$$Y_{i,j}= (D_{i,j} 21 \ T)$$

wherein:

$D_{i,j}$: density of object pixel $(i, j)$ after correction;
$X_{i,j}$: input density of object pixel $(i, j)$;
$E_{i,j}$: error in binarization of object pixel $(i, j)$;

$\alpha_{i,j}$ : weighting coefficient;

$Y_{i,j}$: output image density; and
I : threshold value.

As shown in the foregoing equations, the input image density $X_{i,j}$ of the object pixel is added to errors $E_{i+m,j+n}$ which are generated in surrounding pixels and are weighted (by multiplication of $\alpha_{i+m, j+n}$ and division by $\Sigma \alpha_{m,n}$) to obtain the corrected density $D_{i,j}$ of said object pixel. The output image density $Y_{i,j}$ is obtained by binary digitizing said $D_{i,j}$ with a threshold value T (for example T=32).

A selector 113 selects either the binarized output signal from the notch processing unit 105 or the binarized output signal from the error dispersion process unit 110, and sends the thus selected output signal to an encoding unit 114 or a printer 106 according to the selection of the transmission or copy mode.

In the processing of a character original, the output signal from the notch process unit is selected, and, in the processing of a photograph original or an original containing photograph and characters, the output signal from the error dispersion process unit 110 is selected. The switching of the output signal is conducted by the operation unit 108.

Also, the switching of the transmission or copy mode is made by discriminating whether the telephone number of a destination has been entered before the start key is actuated.

A printer unit 106, for recording an image, is composed of a thermal transfer printer, a laser beam printer, an ink jet printer or the like usually employed in the facsimile apparatus. When the copy mode is selected, the selector 113 sends the binary data from the error dispersion process unit 110 or the notch processing unit 105 to the printer unit 106.

The printer 106 reproduces a notch-free smooth image if the character mode is selected, or a high-quality image with suppressed granular noises if the photograph mode is selected.

The encoding unit 114 encodes the binary data from the selector 113, with a suitable encoding method such as MH or MR.

A modem 115 modulates the data, encoded in the encoding unit 114 and sends the modulated data to a communication line 116.

The image transmitted from the modem 115 achieves a high compression rate, thereby reducing the time for transmission, since said image is smoothed by notch elimination in the character mode, or reduced in granular noises in the photograph mode.

Figure 6:
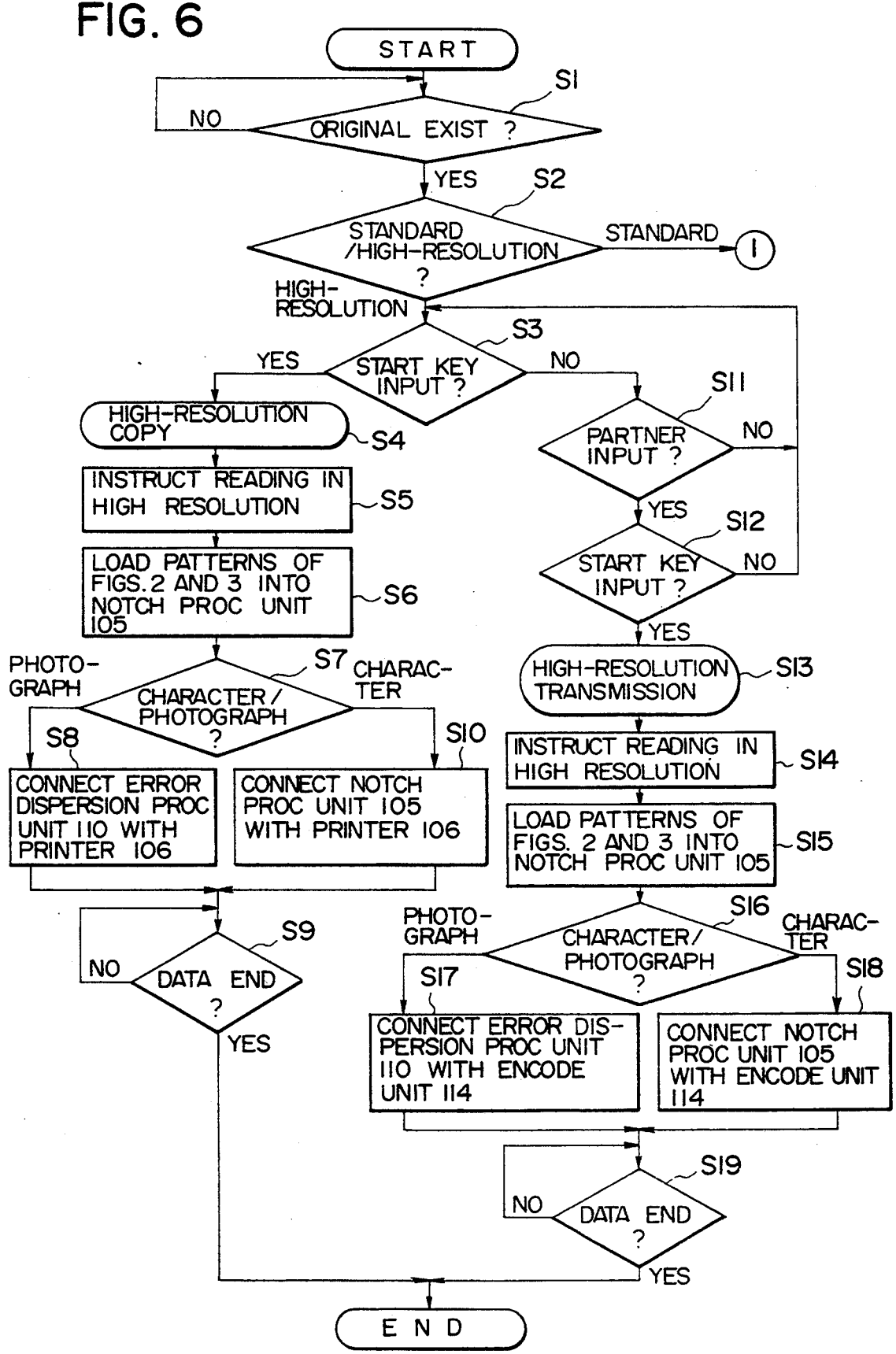
FIGS. 6 and 7 are flow charts showing the control sequence of the present embodiment.
Figure 7:
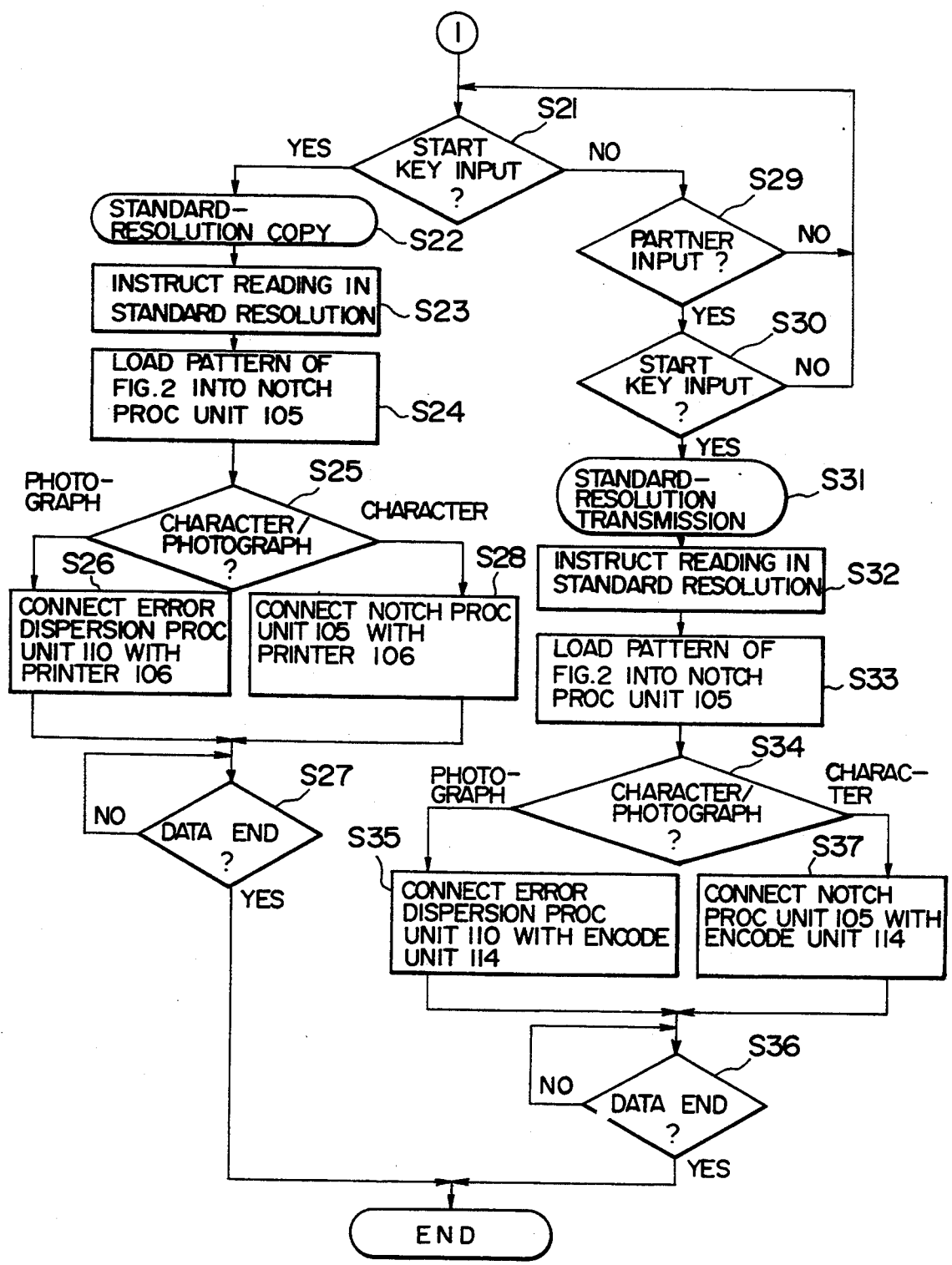
Figure 9:
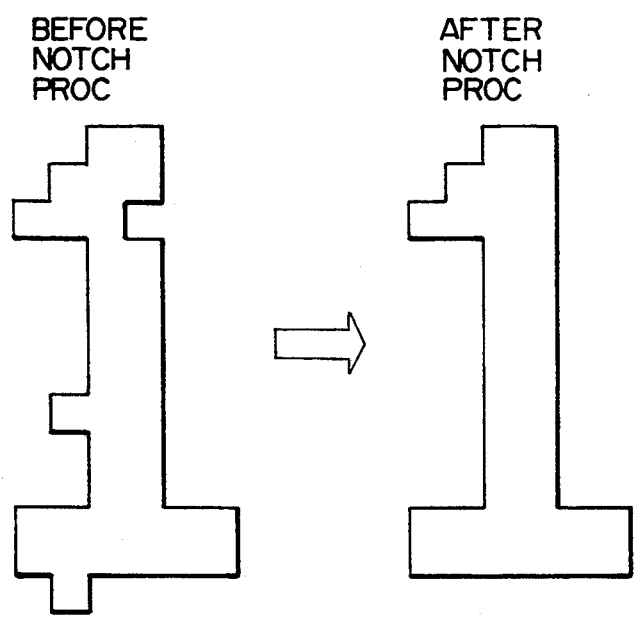
FIG. 9 is a view showing images before and after notch elimination process.

FIGS. 6 and 7 are flow charts showing the control sequence of the facsimile apparatus of the present embodiment. At first a step S1 discriminates whether an original is set in the reader unit 101. When an original is set, a step S2 discriminates whether the operation unit 108 has instructed the image reading with the standard resolution or the high resolution, and, if the standard resolution is selected, a sequence starting from a step S21 in FIG. 7 is executed. If the high resolution is selected, the sequence proceeds to a step S3.

The step S3 discriminates whether a start key in the operation unit 108 has been actuated, and, if actuated, the sequence proceeds to a high-resolution copying sequence starting from a step S4, but, if not actuated, the sequence proceeds to a step S11.

A step S5 sets the reader unit 101 at the high resolution reading mode (7.7 l/mm). Then a step S6 sends a command to the ROM 107 for loading the patterns shown in FIGS. 2A–2H and 3A–3H into the notch process unit 105, whereby said unit 105 compares the data in the window 55 with the 16 notch patterns mentioned above. A next step S7 discriminates whether the operation unit 108 has selected the character mode or the photograph mode (including mixed photograph-character mode), and the sequence proceeds to a step S8 or S10 respectively when the photograph mode or the character mode has been selected. The step S8 so sets the selector 113 as to send the binary data, obtained from the error dispersion process unit 110, to the printer 106, while the step S10 so sets the 10 selector 113 as to send the binary data, from the notch process unit 105, to the printer 106. A step S9 discriminates the end of data, and, if the data have come to the end, the sequence is terminated.

On the other hand, if the step S3 identifies that the start key has not been actuated, a step S11 discriminates whether the telephone number of a facsimile unit of the destination has been entered, and, if entered, the sequence proceeds to a step S12.

The step S12 discriminates whether the start key has been actuated, and, if actuated, the sequence proceeds to a high-resolution transmission sequence starting from a step S13.

A step S14 sets the reader unit 101 at the high resolution reading mode (7.7 l/mm). Then a step S15 sends a command to the ROM 107 for loading the patterns shown in FIGS. 2A–2H and 3A–3H into the notch processing unit 105, whereby said unit 105 compares the data in the window 55 with the 16 notch patterns mentioned above. The next step S16 discriminates whether the operation unit 108 has selected the character mode or the photograph mode (including mixed photograph-character mode), and the sequence proceeds to a step S17 or S18 respectively when the photograph mode or the character mode has been selected. The step S17 so sets the selector 113 as to send the binary data from the error dispersion process unit 110 to the encoding unit 114, while the step S18 so set the selector 113 as to send the binary data from the notch process unit 105 to the encoding unit 114. Then a step S19 discriminates the end of data, and, if the data have come to the end, the sequence is terminated.

If the step S2 identifies that the standard resolution has been selected, the sequence proceeds to a step S21 shown in FIG. 7.

The step S21 discriminates whether the start key of the operation unit 108 has been actuated, and, if actuated, the sequence proceeds to a standard-resolution copying sequence starting from a step S22, but, if not actuated, the sequence proceeds to a step S29.

A step S23 sets the reader unit 101 at the standard resolution reading mode (3.85 l/mm). Then a step S24 sends a command to the ROM 107 for loading the patterns shown in FIGS. 2A–2H into the notch process unit 105, whereby said unit 105 compares the data in the window 54 with 8 notch patterns mentioned above. A next step S25 discriminates whether the operation unit 108 has selected the character mode or the photograph mode (including mixed photograph-character mode), and the sequence proceeds to a step S26 or S28 respectively when the photograph mode or the character mode has been selected. The step S26 so sets the selector 113 as to send the binary data from the error dispersion process unit 110 to the printer 106, while the step S28 so sets the selector 113 as to send the binary data from the notch process unit 105 to the printer 106. Then a step S27 discriminates the end of data, and, if the data have come to the end, the sequence is terminated.

On the other hand, if the step S21 identifies that the start key has not been actuated, the sequence proceeds to a step S29 for discriminating whether the telephone number of a facsimile unit of the destination has been entered, and, if entered, the sequence proceeds to a step S30.

The step S30 discriminates whether the start key has been actuated, and, if actuated, the sequence proceeds to a standard-resolution transmission sequence starting from a step S31.

A step S32 sets the reader unit 101 at the standard resolution reading mode (7.7 l/mm). Then a step S33 sends a command to the ROM 107 for loading the patterns shown in FIGS. 2A–2H into the notch processing unit 105, whereby said unit 105 compares the data in the window 54 with 8 notch patterns mentioned above. A next step S34 discriminates whether the operation unit 108 has selected the character mode or the photograph mode (including mixed photograph-character mode), and the sequence proceeds to a step S35 or S37 respectively when the photograph mode or the character mode has been selected. The step S35 so sets the selector 113 as to send the binary data from the error dispersion process unit 110 to the encoding unit 114, while the step S37 so sets the selector 113 as to send the binary data from the notch process unit 105 to the encoding unit 114. Then a step S36 discriminates the end of data, and, if the data have come to the end, the sequence is terminated.

The above-explained embodiment utilizes notch patterns, shown in FIGS. 3A-3H, corresponding to an increase in the resolution in the sub scanning direction.

An embodiment explained in the following executes notch elimination, corresponding to a higher resolution in the main scanning direction. There are employed a standard resolution of 8×3.85 l/mm and a high resolution of 16×3.85 l/mm in the main scanning direction, and this embodiment utilizes the 8 notch patterns shown in FIGS. 2A-2H in the standard resolution mode, but the 16 notch patterns shown in FIGS. 2A-2H and 8A-8H in the high resolution mode. In this manner there can be obtained an image with a high smoothing effect also in a case where the resolution in the main scanning direction is made higher.

As explained in the foregoing, since the foregoing embodiment varies the notch patterns to be employed in the smoothing process according to the resolution of original image reading, there can be obtained a high-quality image with a high compression efficiency, regardless of the resolution of original image reading.

Also, the foregoing embodiment not only provides a smooth image in the character mode by notch elimination through a smoothing process, but also provides a high-quality image, in the photograph mode, by suppression of granular noises often observed in the halftone image processed by the error dispersion method, as the data of high luminance levels are released as zero density.

As explained in the foregoing, the present invention enables a smoothing process with image patterns corresponding to the resolution of the input image data, thereby providing a high-quality image with satisfactory compression efficiency, from input images of low or high resolution.

Though the present invention has been explained by the preferred embodiment thereof, the present invention is not limited by such embodiment and is subject to various modifications within the scope and spirit of the appended claims.

What is claimed is:

1. An image processing apparatus comprising:
   input means for entering image data;
   memory means for storing plural image patterns;
   comparator means for comparing the image data entered by said input means with the image patterns stored in said memory means; and
   smoothing means for smoothing said input image data according to the result of comparison by said comparator means,
   wherein said comparator means is adapted to vary the image patterns to be used in said comparison, according to a resolution of the image date entered by said input means, and
   wherein said memory means stores plural first image patterns corresponding to image date of a low resolution, and plural second image patterns corresponding to image date of a high resolution.

2. An image processing apparatus according to claim 1, further comprising:
   image reader means for reading an original image and releasing multi-value image data; and
   binarization means for binary digitizing the multi-value image date from said image reader means,
   wherein said input means is adapted to enter binary image date obtained by said binary digitizing.

3. An image processing apparatus according to claim 2, further comprising designation means for designating the resolution of image reading by said image reader means, wherein said comparator means varies the image patterns to be employed in said comparison, according to the designation by said designation means.

4. An image processing apparatus according to claim 3, wherein each of said first image patterns is composed of 3×3 pixels, and each of said second image patterns is composed of 3×4 pixels.

5. An image processing apparatus according to claim 4, wherein said memory means stores eight first image patterns and eight second image patterns.

6. An image processing apparatus according to claim 3, wherein said smoothing means is adapted to effect smoothing on said input image data when the input image data coincide with one of the stored image patterns in said comparison.

7. An image processing apparatus according to claim 3, further comprising:
   recording means for effecting image recording, according to the data smoothed by said smoothing means; and
   transmission means for encoding the data, smoothed by said smoothing means, and transmitting the encoded data to a destination apparatus through a communication channel.

8. An image processing apparatus according to claim 7, further comprising:
   selector means for selecting either a recording operation by said recording means, or a transmitting operation by said transmission means.

9. An image processing apparatus according to claim 2, further comprising:
   conversion means for converting the multi-value image date from said image reader means by a predetermined conversion table; and
   halftone process means for effecting a halftone process on the date converted by said conversion means.

10. An image processing apparatus according to claim 9, wherein said conversion means is adapted to receive luminance data from said image reader means and to convert said luminance date into density data.

11. An image processing apparatus according to claim 10, wherein said conversion means is adapted to convert luminance data of a predetermined luminance or higher to data of zero density.

12. An image processing apparatus according to claim 11, wherein said halftone process is adapted to effect binary digitizing on the density data from said conversion means by the error dispersion method.

13. An image processing apparatus comprising:
    input means for entering image data;
    first image quality improving means for improving an image quality of a halftone image obtained from the image data from said input means;
    halftone process means for effecting a halftone process on the improved halftone image obtained from said first image quality improving means;

binarization means for binary digitizing the image date from said input means; and second image quality improving means for improving the image quality of a binary image obtained by said binarization means.

14. An image processing apparatus according to claim 13, wherein said input means includes image reader means for reading an original image and releasing multi-value image data.

15. An image processing apparatus according to claim 13, wherein said first image quality improving means includes a conversion table for converting luminance data from said input means into density data, said conversion table being adapted to convert luminance data at least equal to a predetermined luminance value, from said input means, into data of zero density.

16. An image processisng apparatus according to claim 13, wherein said second image quality improving means includes:
memory means storing plural image patterns;
comparator means for comparing the binary data from said binarization means with the image patterns stored in said memory means; and
smoothing means for smoothing the binary data from said binarization means according to the result of comparison by said comparator means.

17. An image processing apparatus according to claim 16, wherein said comparator means is adapted to vary the image patterns to be employed in said comparison, according to the resolution of the binary data from said binarization means.

18. An image processing apparatus according to claim 16, wherein said memory stores plural first image patterns corresponding to the binary data of a low resolution, and plural second image patterns corresponding to the binary data of a high resolution.

19. An image processing apparatus according to claim 18, wherein each of said first image patterns is composed of 3×3 pixels, and each of said second image patterns is composed of 3×4pixels.

20. An image processing apparatus according to claim 19, wherein said memory means stores eight first image patterns and eight second image patterns.

21. An image processing apparatus comprising:
input means for entering image data;
memory means for storing plural image patterns;
comparator means for comparing the image data entered by said input means with the image patterns stores in said memory means;
smoothing means for smoothing said input image data according to the result of comparison by said comparator means;
image reader means for reading an original image and releasing multi-value image data;

binarization means for binary digitizing the multi-value image data from said image reader means; and
designating means for designating a resolution of image reading by said image reader means,
wherein said comparator means varies the image patterns to be employed in said comparison, according to the resolution of the image data entered by said input means as designated by the designation by said designation means, and
wherein said input means is adapted to enter binary image date obtained by said binary digitizing.

22. An image processing apparatus comprising:
input means for inputting image data;
memory means for storing plural image patterns;
comparator means for comparing the image date input by said input means with the image patterns stored in said memory means;
smoothing means for smoothing the input image date according to a result of comparison by said comparator means; and
designation means for designating a resolution of image inputting by said input means,
wherein said comparator means varies the image patterns to be employed in the comparison, according to the designation by said designation means.

23. An image processing method comprising the steps of:
inputting image data;
storing plural image patterns;
comparing the image date input in said inputting step with the image patterns stored in said storing step; and
smoothing the input image date according to a result of a comparison in said comparing step,
wherein, in said comparing step, the image patterns to be used in the comparison are varied according to a resolution of the image date input in said inputting step, and
in said storing step, plural first image patterns corresponding to the image date of a low resolution and plural second image patterns corresponding to the image data of a high resolution are stored.

24. An image processing method comprising the steps of:
inputting image data;
storing plural image patterns;
comparing the image data input in said inputting step with the image patterns stored in said storing step;
smoothing the input image date according to a result of comparison in said comparing step; and
designating a resolution of image inputting in said inputting step,
wherein, in said comparing step, the image patterns to be employed are varied according to the designation in said designating step.

* * * * *

UNITED STATES PATENT AND TRADEMARK OFFICE
CERTIFICATE OF CORRECTION

PATENT NO. : 5,408,336
DATED : April 18, 1995
INVENTOR(S) : SHINICHI ISHIDA

It is certified that error appears in the above-identified patent and that said Letters Patent is hereby corrected as shown below:

COLUMN 1

Lines 26-27, "Notch elimination," should read
          --Notch elimination means--.
    Line 31, "FIG. 2A-2H," should read --FIGS. 2A-2H,--.
    Line 38, "respectively" should read --respectively,--.

COLUMN 2

Line 38, "process." should read --processing.--.
    Line 53, "sub scanning" should read --sub-scanning--.

COLUMN 3

Line 13, "j: sub scanning)," should read
        --j: sub-scanning),--.
    Line 30, "process" should read --processing--.
    Line 33, "process" should read --processing--.
    Line 45, "aline" should read --a line--.
    Line 65, "Also" should read --Also,--.
    Line 67, "3×3" should read --3×3 pixels--.

COLUMN 4

Line 6, "process" should read --processing--.
    Line 19, "form" should read --from--.
    Line 23, "area," should read --area--.
    Line 32, "Scale"" should read --Scale",--.
    Line 37, "$D_{ij}=X_{ij}+(EE\alpha_{i+mj+n} \cdot E_{i+mj+n})(1/E\alpha_{m,n})$" should read
        --$D_{ij}=X_{ij}+(\Sigma\Sigma\alpha_{i+mj+n} \cdot E_{i+mj+n})(1/\Sigma\alpha_{m,n})$--.
    Line 39, "$Y_{ij}=63)D_{ij}\geq T)$" should read --$Y_{ij}=63(D_{ij}\geq T)$--.
    Line 41, "$Y_{ij}=(D_{ij}21\ T)$" should read --$Y_{ij}=0(D_{ij}<T)$--.

UNITED STATES PATENT AND TRADEMARK OFFICE
CERTIFICATE OF CORRECTION

PATENT NO. : 5,408,336
DATED : April 18, 1995
INVENTOR(S) : SHINICHI ISHIDA

It is certified that error appears in the above-identified patent and that said Letters Patent is hereby corrected as shown below:

COLUMN 4

Line 47, "weighting coefficient;" should not be italized.
Line 49, "I:" should read --T:--.
Line 54, "E$\alpha_{m,n}$)" should read --$\Sigma\alpha_{m,n}$)--.
Line 66, "process" should read --processing--.

COLUMN 5

Line 49, "process" should read --processing--.
Line 59, "10" should be deleted.
Line 60, "process" should read --processing--.

COLUMN 6

Line 19, "set" should read --sets--.
Line 20, "process" should read --processing--.
Line 35, "process" should read --processing--.
Line 47, "process" should read --processing--.

COLUMN 7

Line 7, "process" should read --processing--.
Line 13, "sub scanning" should read --sub-scanning--.
Line 63, "date" should read --data--.
Line 66, "date" should read --data--.
Line 68, "date" should read --data--.

COLUMN 8

Line 6, "date" should read --data--.
Line 8, "date" should read --data--.

UNITED STATES PATENT AND TRADEMARK OFFICE
CERTIFICATE OF CORRECTION

PATENT NO. : 5,408,336
DATED : April 18, 1995
INVENTOR(S) : SHINICHI ISHIDA

It is certified that error appears in the above-identified patent and that said Letters Patent is hereby corrected as shown below:

COLUMN 8

Line 16, "3," should read --1,--.
Line 23, "3," should read --1,--.
Line 28, "3," should read --1,--.
Line 44, "date" should read --data--.
Line 47, "date" should read --data--.
Line 52, "date" should read --data--.

COLUMN 9

Line 2, "date" should read --data--.
Line 18, "processisng" should read --processing--.
Line 42, "3x4pixels." should read --3x4 pixels.--.
Line 51, "stores" should read --stored--.

COLUMN 10

Line 12, "date" should read --data--.
Line 16, "date" should read --data--.
Line 19, "date" should read --data--.
Line 31, "date" should read --data--.
Line 34, "date" should read --data--.
Line 38, "date" should read --data--.
Line 41, "date" should read --data--.

UNITED STATES PATENT AND TRADEMARK OFFICE
CERTIFICATE OF CORRECTION

PATENT NO. : 5,408,336

DATED : April 18, 1995

INVENTOR(S) : SHINICHI ISHIDA

It is certified that error appears in the above-identified patent and that said Letters Patent is hereby corrected as shown below:

<u>COLUMN 10</u>

Line 50, "date" should read --data--.

Signed and Sealed this

Twenty-first Day of November, 1995

Attest:

BRUCE LEHMAN

Attesting Officer

Commissioner of Patents and Trademarks